United States Patent
Zhang et al.

(10) Patent No.: US 11,792,799 B2
(45) Date of Patent: Oct. 17, 2023

(54) SCHEDULING TRANSMISSION WITH MULTIPLE TRANSPORT BLOCKS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/302,176

(22) Filed: Apr. 26, 2021

(65) Prior Publication Data

US 2022/0346117 A1    Oct. 27, 2022

(51) Int. Cl.
*H04W 56/00* (2009.01)
*H04W 72/20* (2023.01)
*H04W 72/0446* (2023.01)
*H04W 72/044* (2023.01)

(52) U.S. Cl.
CPC ......... *H04W 72/20* (2023.01); *H04W 72/046* (2013.01); *H04W 72/0446* (2013.01)

(58) Field of Classification Search
CPC ......... H04W 72/1278; H04W 72/0446; H04W 72/046
USPC ....................................................... 370/329
See application file for complete search history.

(56) References Cited

U.S. PATENT DOCUMENTS

| | | | |
|---|---|---|---|
| 2010/0177722 A1 | 7/2010 | Guvenc | |
| 2019/0253200 A1* | 8/2019 | Salem | H04W 72/23 |
| 2020/0107353 A1* | 4/2020 | Jung | H04L 5/0053 |
| 2020/0275430 A1* | 8/2020 | Salem | H04L 1/1614 |
| 2021/0144743 A1* | 5/2021 | Rastegardoost | H04W 72/23 |
| 2021/0243731 A1* | 8/2021 | Shin | H04W 72/23 |
| 2022/0045792 A1* | 2/2022 | Song | H04L 1/1896 |
| 2022/0069884 A1* | 3/2022 | Zhang | H04B 17/318 |
| 2022/0086872 A1* | 3/2022 | Shimezawa | H04L 5/0039 |
| 2022/0158715 A1* | 5/2022 | Bishwarup | H04W 76/19 |
| 2022/0256573 A1* | 8/2022 | Frenne | H04L 5/0053 |

FOREIGN PATENT DOCUMENTS

EP    3516890 A2    7/2019

OTHER PUBLICATIONS

International Search Report and Written Opinion—PCT/US2022/071006—ISA/EPO—dated May 30, 2022.
Lenovo, et al., "Design of Scheduling of Multiple DL/UL Transport Blocks for NBioT", 3GPP TSG RAN WG1 Meeting #98bis, R1-1910152, 3rd Generation Partnership Project, Mobile Competence Centre, 650, Route Des Lucioles, F-06921 Sophia-Antipolis Cedex, France, vol. RAN WG1, No. Hongqing, China, Oct. 14, 2019-Oct. 18, 2019, Oct. 4, 2019, XP051808088, 4 Pages.

* cited by examiner

*Primary Examiner* — Sai Ming Chan
(74) *Attorney, Agent, or Firm* — QUALCOMM Incorporated

(57) ABSTRACT

Various aspects of the present disclosure generally relate to wireless communication. In some aspects, a user equipment (UE) may receive scheduling information for a communication including multiple transport blocks (TBs), wherein the multiple TBs include at least a first TB associated with an uplink transmission and at least a second TB associated with a downlink transmission. The UE may communicate in accordance with the scheduling information. Numerous other aspects are described.

30 Claims, 10 Drawing Sheets

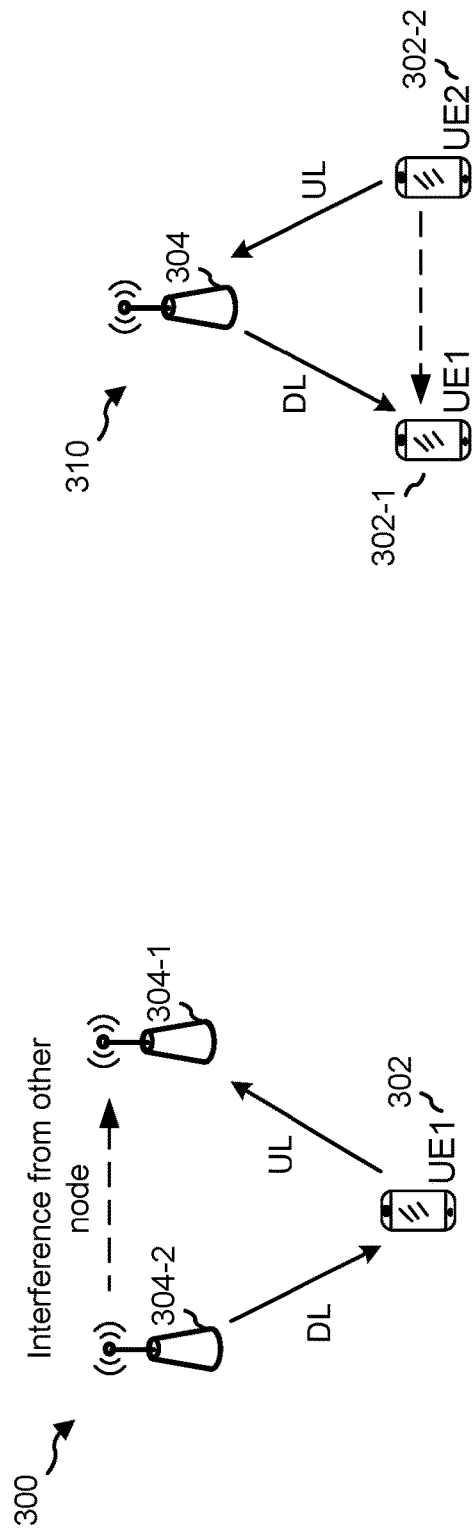
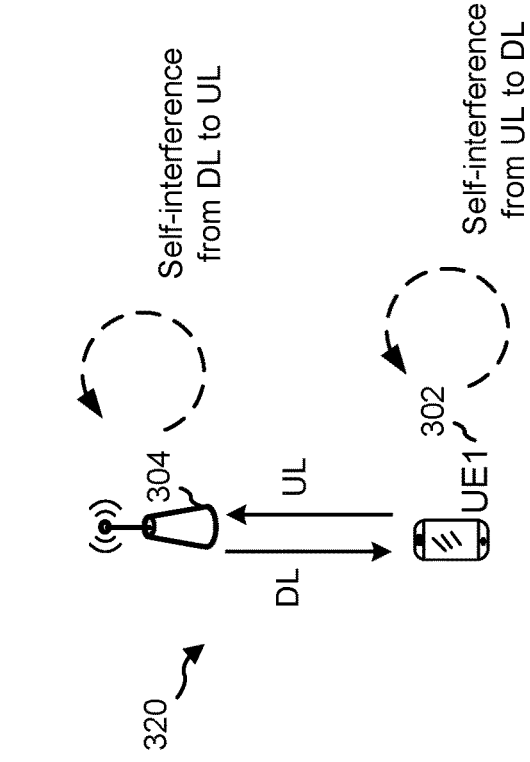
FIG. 3A
FIG. 3B
FIG. 3C

SCHEDULING TRANSMISSION WITH MULTIPLE TRANSPORT BLOCKS

FIELD OF THE DISCLOSURE

Aspects of the present disclosure generally relate to wireless communication and to techniques and apparatuses for scheduling a transmission with multiple transport blocks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving scheduling information for a communication including multiple transport blocks (TBs), wherein the multiple TBs include at least a first TB associated with an uplink transmission and at least a second TB associated with a downlink transmission; and communicating in accordance with the scheduling information.

In some aspects, a method of wireless communication performed by a base station includes transmitting scheduling information for a communication including multiple TBs, wherein the multiple TBs include at least a first TB associated with an uplink transmission and at least a second TB associated with a downlink transmission; and communicating in accordance with the scheduling information.

In some aspects, a UE for wireless communication includes a memory, and one or more processors, coupled to the memory, configured to: receive scheduling information for a communication including multiple TBs, wherein the multiple TBs include at least a first TB associated with an uplink transmission and at least a second TB associated with a downlink transmission; and communicate in accordance with the scheduling information.

In some aspects, a base station for wireless communication includes a memory, and one or more processors, coupled to the memory, configured to: transmit scheduling information for a communication including multiple TBs, wherein the multiple TBs include at least a first TB associated with an uplink transmission and at least a second TB associated with a downlink transmission; and communicate in accordance with the scheduling information.

In some aspects, a non-transitory computer-readable medium storing a set of instructions for wireless communication includes one or more instructions that, when executed by one or more processors of a UE, cause the UE to: receive scheduling information for a communication including multiple TBs, wherein the multiple TBs include at least a first TB associated with an uplink transmission and at least a second TB associated with a downlink transmission; and communicate in accordance with the scheduling information.

In some aspects, a non-transitory computer-readable medium storing a set of instructions for wireless communication includes one or more instructions that, when executed by one or more processors of a base station, cause the base station to: transmit scheduling information for a communication including multiple TBs, wherein the multiple TBs include at least a first TB associated with an uplink transmission and at least a second TB associated with a downlink transmission; and communicate in accordance with the scheduling information.

In some aspects, an apparatus for wireless communication includes means for receiving scheduling information for a communication including multiple TBs, wherein the multiple TBs include at least a first TB associated with an uplink transmission and at least a second TB associated with a downlink transmission; and means for communicating in accordance with the scheduling information.

In some aspects, an apparatus for wireless communication includes means for transmitting scheduling information for a communication including multiple TBs, wherein the multiple TBs include at least a first TB associated with an uplink transmission and at least a second TB associated with a downlink transmission; and means for communicating in accordance with the scheduling information.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex (FD) communication in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
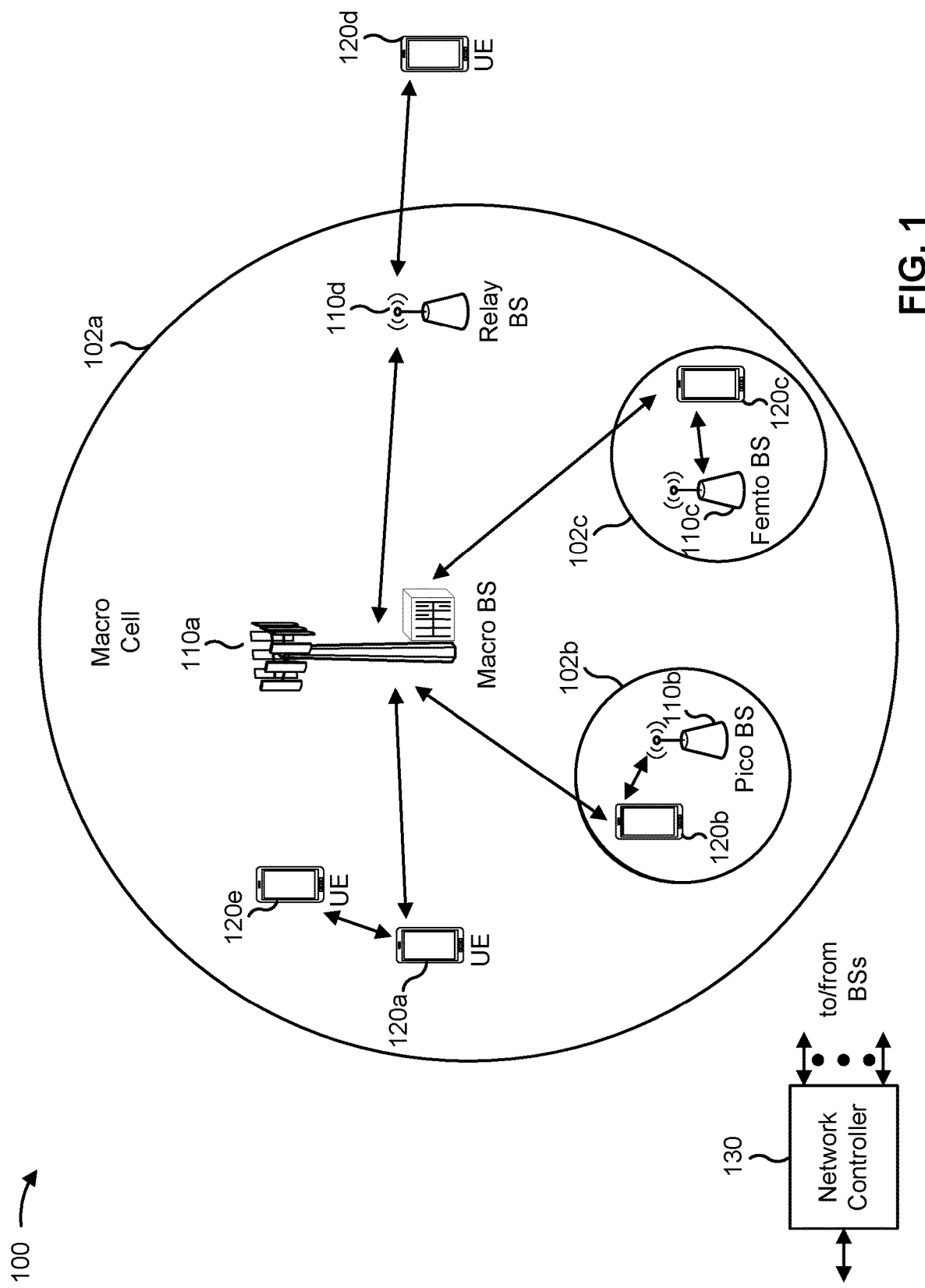
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
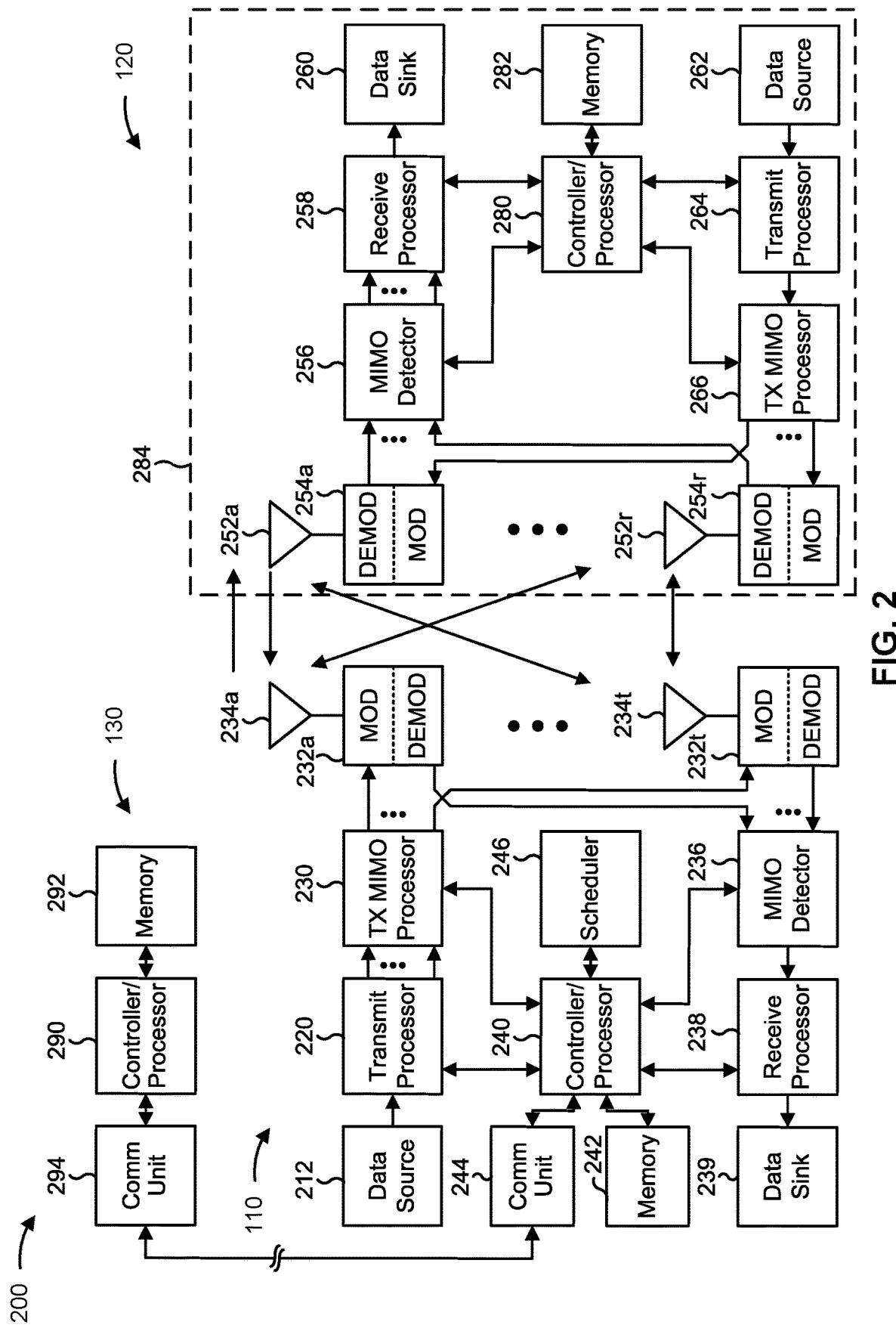
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with scheduling a transmission with multiple transport blocks, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE includes means for receiving scheduling information for a communication including multiple TBs, wherein the multiple TBs include at least a first TB associated with an uplink transmission and at least a second TB associated with a downlink transmission; and/or means for communicating in accordance with the scheduling information. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting scheduling information for a communication including multiple TBs, wherein the multiple TBs include at least a first TB associated with an uplink transmission and at least a second TB associated with a downlink transmission; and/or means for communicating in accordance with the scheduling information. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIGS. 3A-3C are diagrams illustrating examples 300, 310, 320 of full duplex (FD) communication in accordance with the present disclosure. An FD communication is a communication that utilizes overlapped time resources at a single node for transmission and reception. For example, a UE or a base station may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indication (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-colocation (QCL) type. A QCL type may indicate one or more spatial parameters to be derived from the source signal. The source signal may be referred to as a QCL source.

The example 300 of FIG. 3A includes a UE1 302 and two base stations (e.g., TRPs) 304-1, 304-2, wherein the UE1 302 is sending UL transmissions to base station 304-1 and is receiving DL transmissions from base station 304-2. In the example 300 of FIG. 3A, FD is enabled for the UE1 302, but not for the base stations 304-1, 304-2. Thus, the base stations 304-1 and 304-2 are half duplex base stations. The example 310 of FIG. 3B includes two UEs, UE1 302-1 and UE2 302-2, and a base station 304, wherein the UE1 302-1 is receiving a DL transmission from the base station 304 and the UE2 302-2 is transmitting a UL transmission to the base station 304. In the example 310 of FIG. 3B, FD is enabled for the base station 304, but not for the UEs UE1 302-1 and UE2 302-2. Thus, the UEs UE1 302-1 and UE2 302-2 are half duplex UEs. The example 320 of FIG. 3C includes a UE1 302 and a base station 304, wherein the UE1 302 is receiving a DL transmission from the base station 304 and the UE1 302 is transmitting a UL transmission to the base station 304. In the example 320 of FIG. 3C, FD is enabled for both the UE1 302 and the base station 304.

In FIGS. 3A-3C, interference is indicated by dashed lines. Interference can occur between nodes of examples 300, 310, 320 (referred to as "cross-link interference"). Examples of cross-link interference are shown in FIGS. 3A and 3B. In FIG. 3A, BS 304-2's downlink transmission interferes with BS 304-1's uplink transmission. In FIG. 3B, UE1 302-1's uplink transmission interferes with UE2 302-2's downlink transmission. In some cases, self-interference can occur. Self-interference occurs when a node's transmission interferes with a reception operation of the node. For example, self-interference may occur due to reception by a receive antenna of radiated energy from a transmit antenna, crosstalk between components, or the like. Examples of self-interference at a UE 302 (from an uplink transmission to a downlink reception) and at a BS 304 (from a downlink transmission to an uplink reception) are shown in FIG. 3C.

It should be noted that the above-described cross-link interference and self-interference conditions can occur in half duplex deployments and in full duplex deployments.

As indicated above, FIGS. 3A-3C are provided as one or more examples. Other examples may differ from what is described with regard to FIGS. 3A-3C.

A UE and a base station may communicate with each other via a wireless connection such as an air interface connection. For example, the UE and the base station may perform uplink communication (flowing from the UE to the base station) and/or downlink communication (flowing from the base station to the UE). Generally, a data payload that is to be transmitted by a UE or a base station may be packaged in a transport block (TB). A TB is a payload that is passed from a medium access control (MAC) layer to a physical layer for transmission via a shared data channel (such as a physical downlink shared channel (PDSCH) or a physical uplink shared channel (PUSCH)). A TB may undergo physical layer processing before being mapped onto a shared data channel for transmission over the wireless connection. For example, a cyclic redundancy check (CRC) may be added to the transport block, and then the transport block may be segmented into codeblocks (which may have their own CRCs) and transmitted via the wireless connection.

A communication (such as a PDSCH or a PUSCH) may be scheduled by scheduling information. For example, downlink control information (DCI), which may be transmitted via a physical downlink control channel (PDCCH), may carry the scheduling information. Scheduling information notifies a UE of resources on which to transmit a PUSCH or on which to receive a PDSCH, as well as parameters used for such transmission or reception.

FD communication (described above) may enable simultaneous uplink/downlink transmission in some frequency ranges, such as Frequency Range 2. An FD capability can be present at the base station, the UE, or both. For example, at the UE, an uplink transmission can be from one panel and a downlink reception can use another panel. As another example, at the base station, the uplink reception can use one panel and the downlink transmission can be from a second panel. In some cases, an FD capability may be conditional on, for example, beam separation, self-interference, clutter echo, or the like. FD communication may provide latency reduction, spectrum efficiency enhancement (such as per cell and per UE), and more efficient resource utilization.

Traditionally, DCI schedules either an uplink communication or a downlink communication. For example, DCI may schedule a communication including one or more transport blocks on the uplink, or a communication including one or more transport blocks on the downlink. However, as FD communication is deployed and used, the usage of respective (separate) DCI transmissions for uplink and downlink communications may introduce significant overhead, particularly where multiple uplink TBs and multiple downlink TBs are to be scheduled. Furthermore, there is a gap between the reception of DCI and the performance of the corresponding communication to provide for preparation to transmit or receive the communication scheduled by the DCI, so the usage of multiple DCI transmissions may introduce resource inefficiency due to these gaps. Still further, a UE may monitor PDCCH resources to receive a DCI, so the usage of an increased number of DCIs may increase resource usage in association with monitoring PDCCH resources.

Some techniques and apparatuses described herein provide scheduling of a communication (that is, one or more communications) of multiple TBs including at least one uplink TB and at least one downlink TB by a single DCI. For example, the multiple TBs may be SDM, FDM, or time division multiplexed (TDM). Thus, overhead is reduced, scheduling gaps are reduced, and PDCCH monitoring resources are conserved. Furthermore, some techniques and apparatuses described herein provide rules for cross-slot scheduling, such as whether cross-slot scheduling is allowed, and if so, how cross-slot scheduling should be performed and interpreted. Still further, some techniques and apparatuses described herein provide for beam changes among transport blocks, and for determination of downlink and uplink beams for individual TBs and for repetitions of TBs associated with a single scheduling DCI. In this way, diversity is improved and compatibility of uplink and downlink TBs is improved while signaling overhead is reduced.

Figure 4:
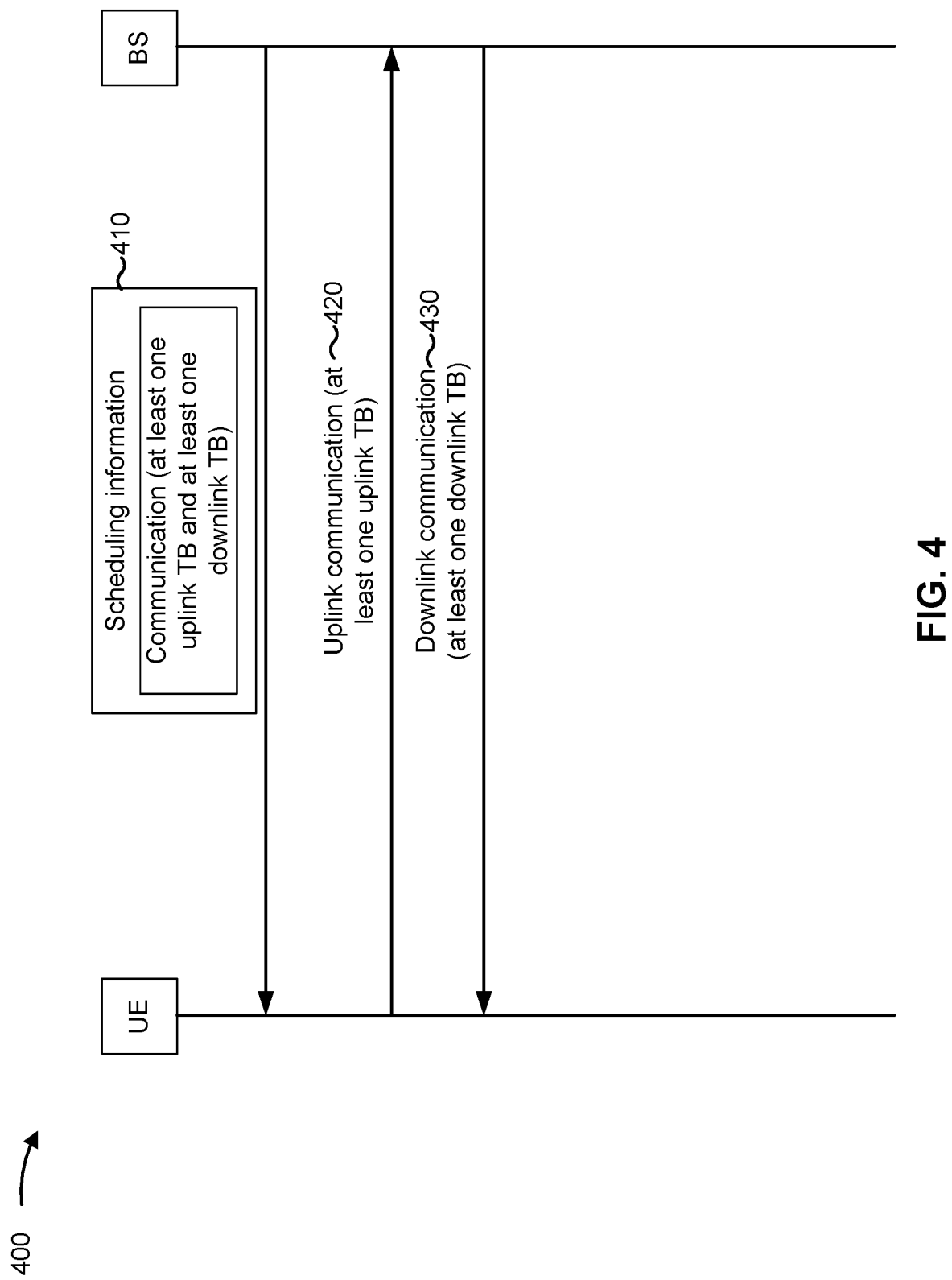
FIG. 4 is a diagram illustrating an example of signaling associated with scheduling a transmission with multiple TBs, in accordance with the present disclosure.
Figure 5:
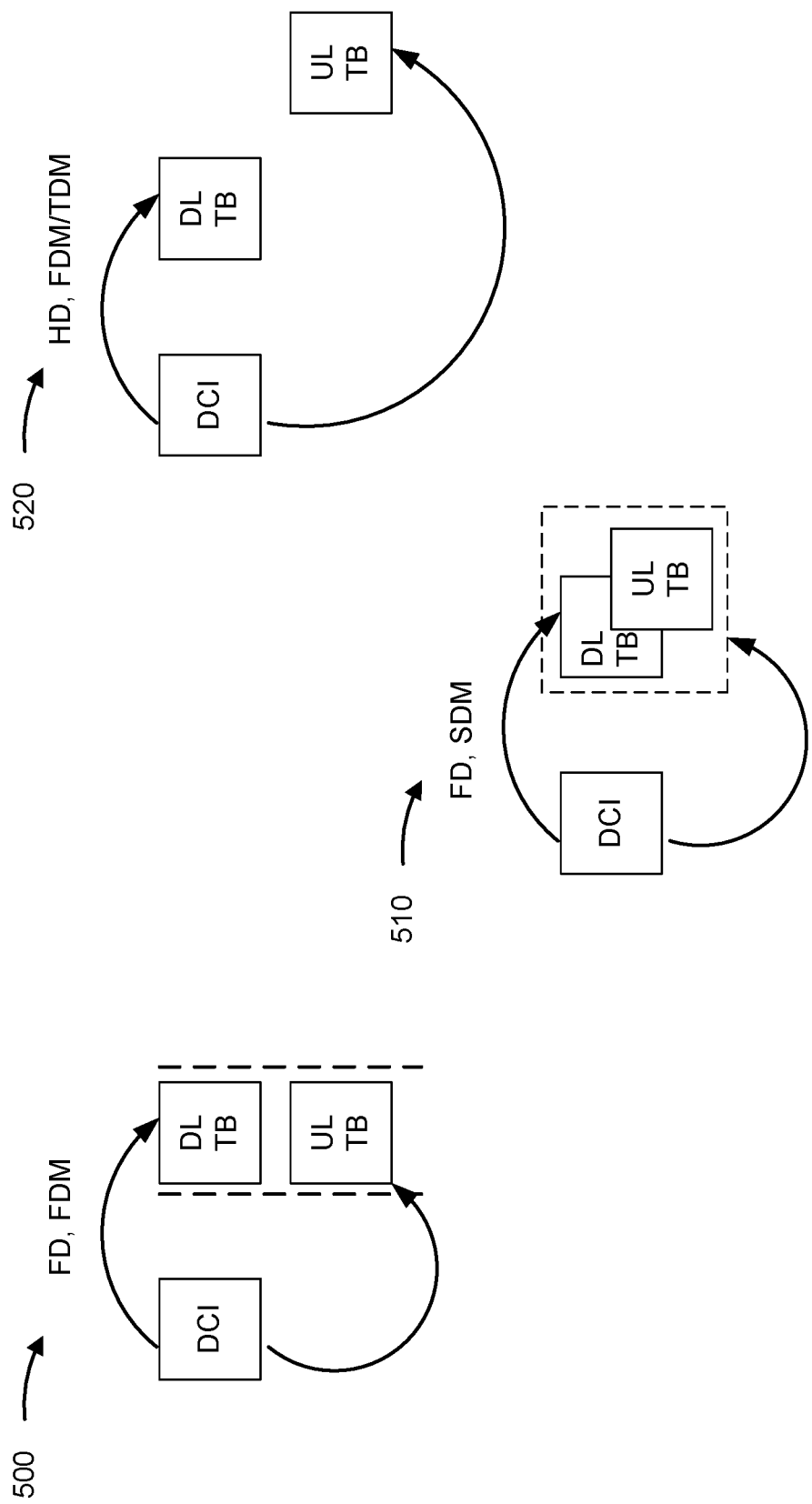
FIGS. 5 and 6 are diagrams illustrating examples of configurations of multiple TBs for a transmission with multiple TBs, in accordance with the present disclosure.
Figure 6:
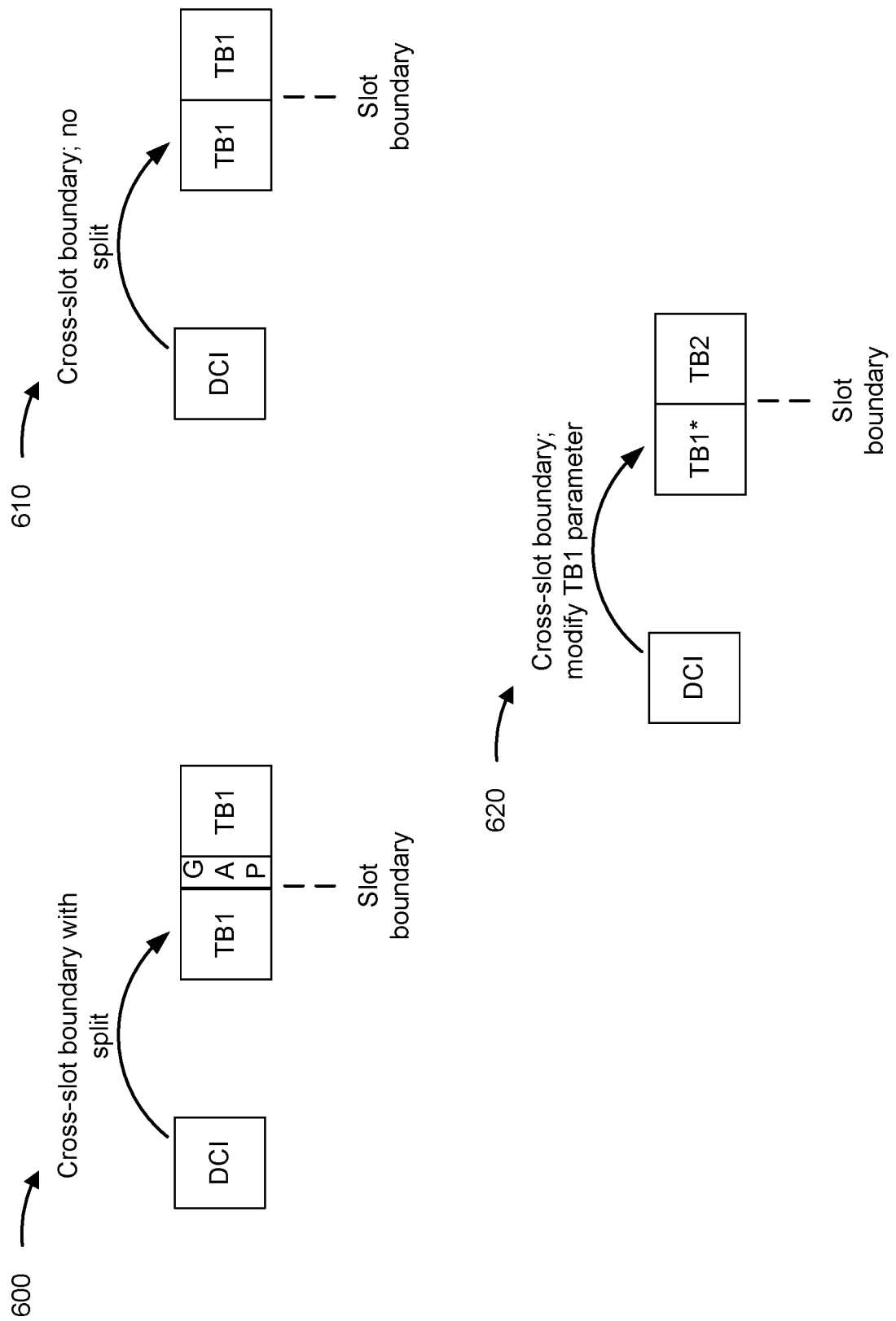

FIG. 4 is a diagram illustrating an example 400 of signaling associated with scheduling a transmission with multiple TBs, in accordance with the present disclosure. FIGS. 5 and 6 are diagrams illustrating examples 500 and 600 of configurations of multiple TBs for a transmission with multiple TBs, in accordance with the present disclosure. Examples 500 and 600 are described in context during the description of example 400.

As shown by reference number 410, the BS may transmit, and the UE may receive, scheduling information. For example, the scheduling information may be provided via DCI or the like. In some aspects, the scheduling information may be based at least in part on a configuration of the UE. For example, the scheduling information may include an indication of one or more parameters selected from a set of parameters configured at the UE (such as by the BS).

As shown, the scheduling information may schedule at least one uplink TB and at least one downlink TB. For example, the scheduling information may schedule at least one uplink transmission by the UE, which may include at least one TB. Additionally, the scheduling information may schedule at least one downlink transmission by the UE, which may include at least one TB. In other words, the scheduling information may schedule a first TB associated with an uplink transmission and a second TB associated with a downlink transmission. In some aspects, the first TB and the second TB carry different data. Additionally, or alternatively, two or more TBs associated with a same link direction (such as two or more uplink TBs or two or more downlink TBs) may carry different data and/or may use different beams. Thus, a single DCI schedules both an uplink communication and a downlink communication, which improves efficiency of scheduling the UE's communications relative to transmitting separate DCI.

In some aspects, multiple TBs associated with the uplink, or multiple TBs associated with the downlink, may be scheduled with different beams. For example, the scheduling information may schedule the multiple TBs using two or more different beams.

Turning to FIG. 5, in some aspects, the at least one uplink TB and the at least one downlink TB may be associated with an FD communication. For example, as in example 500, the at least one uplink TB and the at least one downlink TB may be FDM on the same time resource and/or the same spatial resource. As another example, as in example 510, the at least one uplink TB and the at least one downlink TB may be SDM on the same time resource and/or the same frequency resource. In example 510, the at least one uplink TB and the at least one downlink TB may have different spatial configurations, such as different TCI states (which may indicate different quasi-colocation (QCL) parameters) indicating different beams. In other aspects, the at least one uplink TB and the at least one downlink TB may be associated with a half duplex (HD) communication. For example, as in example 520, the at least one uplink TB and the at least one downlink TB may be FDM and/or TDM on different time resources. In example 520, the at least one uplink TB and the at least one downlink TB occupy different frequency resources, though in some aspects, the at least one uplink TB and the at least one downlink TB may occupy the same frequency resources (as in a time division duplexing carrier).

In some aspects, a TB scheduled by the scheduling information may be associated with multiple beams. For example, the scheduling information may indicate multiple repetitions of the TB. In this case, the TB may be associated with multiple beams (such as multiple TCI states) corresponding to the multiple repetitions. For example, each repetition may be associated with a beam, or repetitions may be associated with one of two or more beams indicated by the scheduling information. In some aspects, a first TB scheduled by the scheduling information may be associated with multiple beams (such as multiple TCI states for different repetitions of the scheduling information), and a second TB scheduled by the scheduling information may be associated with a single beam or TCI. The first TB can be an uplink TB or a downlink TB, and the second TB can be an uplink TB or a downlink TB. For example, the first TB and the second TB may be associated with a same link direction (e.g., the uplink or the downlink). In some aspects, each repetition of a TB associated with a given link direction may use a same beam (such as a same TCI state). In some aspects, each repetition of a TB associated with a given link direction may use a same beamsweeping configuration, such as a same sequence of beam parameters used to perform beamsweeping.

In some aspects, a TB scheduled by the scheduling information may be contained within a slot. For example, the TBs scheduled by the scheduling information may not cross slot boundaries. As another example, there may be a rule that does not allow cross slot boundary scheduling for the DCI scheduling the one or more uplink TBs and the one or more downlink TBs.

In some aspects, a TB scheduled by the scheduling information may cross a slot boundary of a first slot and a second slot. For example, if a slot includes X symbols, the TB may include data to be mapped to more than X symbols. FIG. 6 shows examples 600, 610, and 620 of how the UE and the base station may handle cross slot boundary scheduling by a DCI scheduling one or more uplink TBs and one or more downlink TBs. In example 600, a TB crosses a slot boundary of a first slot and a second slot, so a first part of the TB is transmitted in the first slot and a second part of the TB is transmitted in the second slot. Furthermore, in example 600, the first part and the second part are separated from each other by a gap. The gap may be used, in some aspects, for a PDCCH or the like.

In example 610, a TB crosses a slot boundary of a first slot and a second slot, so a first part of the TB is transmitted in the first slot and a second part of the TB is transmitted in the second slot. Furthermore, in example 610, the first part and the second part are not separated from each other by a gap. For example, there may be no PDCCH between the first part and the second part. Thus, example 610 may provide continuous transmission across the slot boundary.

Example 620 shows an example where a TB1 is scheduled to cross a slot boundary of a first slot and a second slot. In example 620, one or more parameters of TB1 are modified such that TB1 can be transmitted in a single slot, as indicated by the asterisk on TB1. For example, TB1 may be transmitted using an increased data rate within a decreased number of symbols (relative to what is indicated by the scheduling information). Thus, a TB2 can be transmitted in the second slot.

In some aspects, an uplink TB and a downlink TB for an FD communication (that is, a communication using overlapped time resources) may use paired beams. Paired beams are beams selected for an FD communication based at least in part on a property of the paired beams. For example, paired beams may be selected based at least in part on an interference property, such as a signal to interference plus noise ratio (SINR) of self-interference or cross-link interference associated with the paired beams or a similar measurement. The BS may determine paired beams for an uplink TB and a downlink TB, and may indicate the paired beams via the scheduling information. For example, the BS may indicate respective TCI states of the paired beams in the scheduling information.

In some aspects, paired beams may be selected based at least in part on a cross slot boundary TB. For example, given an FD uplink TB and a downlink TB that cross a slot boundary, a first paired beam may be used for a first part of the uplink TB and the downlink TB, and a second paired beam may be used for a second part of the uplink TB and the downlink TB. In other words, each TB may have one or more TCI states, and beams may be paired per TCI states. Thus, joint cross slot boundary splitting is provided for a downlink TB and an uplink TB by pairing beams for the downlink TB and the uplink TB.

In some aspects, a TB associated with an FD communication may be associated with multiple repetitions. The BS may determine, and the UE may use, paired beams for each repetition of the TB. For example, if each repetition uses the same beam, then downlink beams and uplink beams across all repetitions may be configured to be paired beams based at least in part on the same beam. If two or more repetitions use different beams (such as for beamsweeping), then downlink beams and uplink beams per repetition may be configured to be paired beams.

Returning to FIG. 4, as shown by reference number 420, the UE may transmit, and the BS may receive, an uplink communication (e.g., one or more uplink communications) including the at least one uplink TB scheduled by the scheduling information. Furthermore, as shown by reference number 430, the BS may transmit, and the UE may receive, a downlink communication (e.g., one or more downlink communications) including the at least one downlink TB scheduled by the scheduling information. The UE may use one or more beams to perform the uplink communication and the downlink communication, such as one or more beams indicated by the scheduling information as described in connection with reference number 410 and FIGS. 5 and 6. The steps shown by reference numbers 420 and 430 are collectively referred to herein as communicating in accordance with the scheduling information.

As indicated above, FIGS. 4-6 are provided as examples. Other examples may differ from what is described with regard to FIGS. 4-6.

Figure 7:
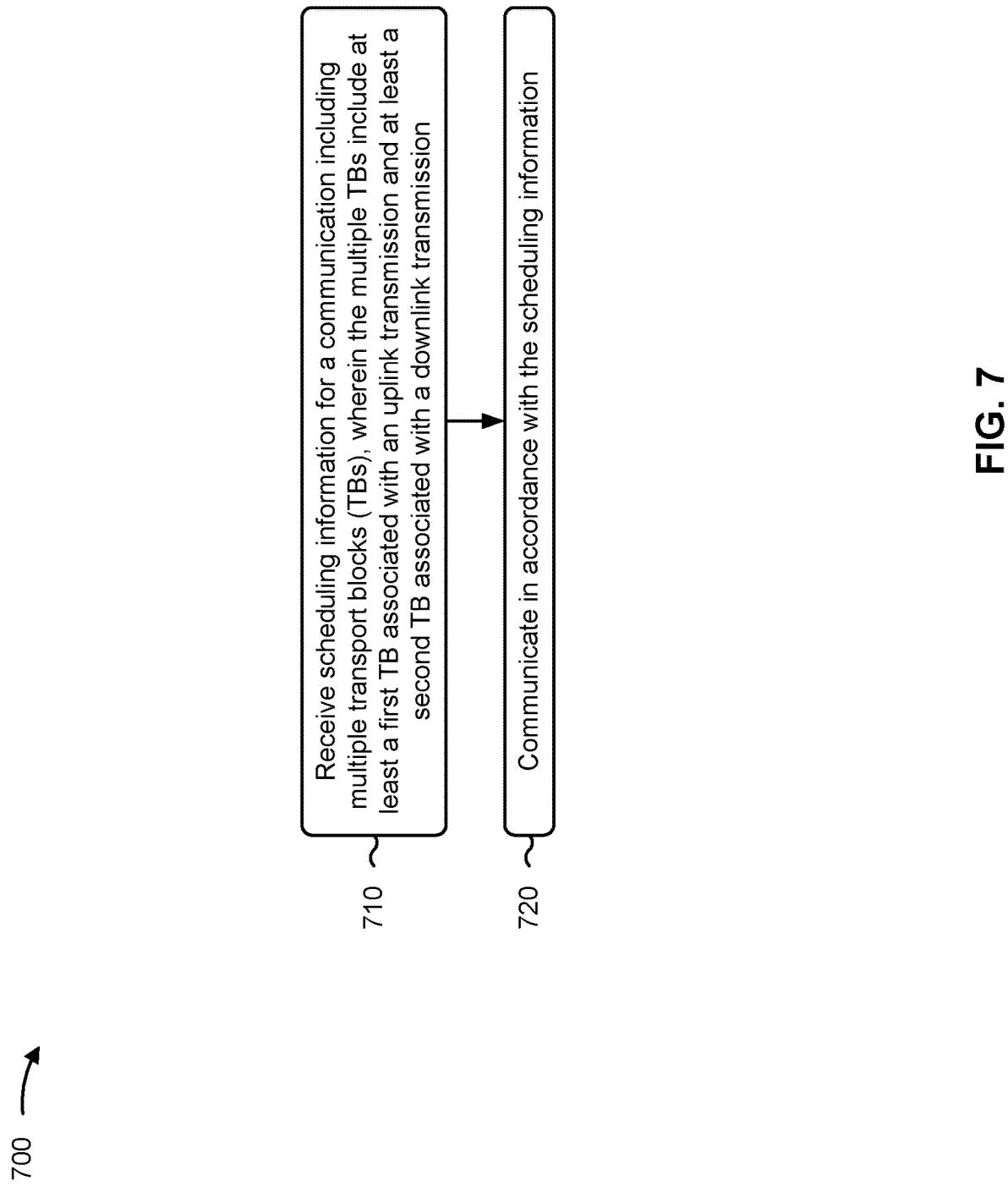
FIGS. 7-8 are diagrams illustrating example processes associated with TB transmission for multiple TBs, in accordance with the present disclosure.

FIG. 7 is a diagram illustrating an example process 700 performed, for example, by a UE, in accordance with the present disclosure. Example process 700 is an example where the UE (e.g., UE 120) performs operations associated with scheduling a transmission with multiple transport blocks.

As shown in FIG. 7, in some aspects, process 700 may include receiving scheduling information for a communication including multiple TBs, wherein the multiple TBs include at least a first TB associated with an uplink transmission and at least a second TB associated with a downlink transmission (block 710). For example, the UE (e.g., using reception component 902, depicted in FIG. 9) may receive scheduling information for a communication including multiple TBs, wherein the multiple TBs include at least a first TB associated with an uplink transmission and at least a second TB associated with a downlink transmission, as described above.

As further shown in FIG. 7, in some aspects, process 700 may include communicating in accordance with the scheduling information (block 720). For example, the UE (e.g., using transmission component 904 and reception component 902 depicted in FIG. 9) may communicate in accordance with the scheduling information, as described above.

Process 700 may include additional aspects, such as any single aspect or any combination of aspects described below and/or in connection with one or more other processes described elsewhere herein.

In a first aspect, the communication includes multiple TBs associated with the uplink transmission or multiple TBs associated with the downlink transmission, and each TB, of the multiple TBs associated with the uplink transmission or the multiple TBs associated with the downlink transmission, carries different data.

In a second aspect, alone or in combination with the first aspect, the communication includes multiple TBs associated with the uplink transmission or multiple TBs associated with the downlink transmission, and each TB, of the multiple TBs associated with the uplink transmission or the multiple TBs associated with the downlink transmission, uses a different beam.

In a third aspect, alone or in combination with one or more of the first and second aspects, a TB, of the multiple TBs, crosses a slot boundary of a first slot and a second slot, and communicating in accordance with the scheduling information further comprises communicating a first part of the TB in the first slot, and a remainder of the TB in the second slot.

In a fourth aspect, alone or in combination with one or more of the first through third aspects, the first part of the TB and the remainder of the TB are separated from each other by a gap.

In a fifth aspect, alone or in combination with one or more of the first through fourth aspects, the first part of the TB and the remainder of the TB are contiguous to each other.

In a sixth aspect, alone or in combination with one or more of the first through fifth aspects, a TB, of the multiple TBs, crosses a slot boundary of a first slot and a second slot, and communicating in accordance with the scheduling information further comprises communicating the TB in the first slot, and another TB of the multiple TBs in the second slot, wherein the TB is associated with a higher data rate and a smaller number of symbols than the other TB.

In a seventh aspect, alone or in combination with one or more of the first through sixth aspects, the scheduling information is based at least in part on a rule that disallows scheduling a TB that crosses a slot boundary of a first slot and a second slot.

In an eighth aspect, alone or in combination with one or more of the first through seventh aspects, the first TB and the second TB are time division multiplexed.

In a ninth aspect, alone or in combination with one or more of the first through eighth aspects, the first TB and the second TB overlap in a time dimension.

In a tenth aspect, alone or in combination with one or more of the first through ninth aspects, the scheduling information indicates a first beam for the first TB and a second beam for the second TB, and, if the first TB and the second TB overlap in time, the first beam and the second beam are paired beams associated with a self-interference measurement that satisfies a threshold.

In an eleventh aspect, alone or in combination with one or more of the first through tenth aspects, if the first TB and the second TB cross a slot boundary and overlap with each other in time, a first part of the first TB and the second TB uses a first set of paired beams, and a second part of the first TB and the second TB use a second set of paired beams.

In a twelfth aspect, alone or in combination with one or more of the first through eleventh aspects, the second set of paired beams are the same as the first set of paired beams.

In a thirteenth aspect, alone or in combination with one or more of the first through twelfth aspects, the second set of paired beams are different than the first set of paired beams.

In a fourteenth aspect, alone or in combination with one or more of the first through thirteenth aspects, the first TB and the second TB are configured with repetitions, and each repetition uses a respective set of paired downlink and uplink beams. A set of paired downlink and uplink beams includes a downlink beam and an uplink beam that are included in a set of paired beams In a fifteenth aspect, alone or in combination with one or more of the first through fourteenth aspects, each repetition of a TB, of the first TB or the second TB, that is associated with a given link direction, uses a same beam.

In a sixteenth aspect, alone or in combination with one or more of the first through fifteenth aspects, the repetitions of a TB, of the first TB or the second TB, associated with a given link direction, use a given beamsweeping configuration.

In a seventeenth aspect, alone or in combination with one or more of the first through sixteenth aspects, the repetitions of a TB, of the first TB or the second TB, associated with a downlink and an uplink, use a given beamsweeping configuration.

In an eighteenth aspect, alone or in combination with one or more of the first through seventeenth aspects, the scheduling information indicates that a TB of the multiple TBs is associated with multiple beams.

In a nineteenth aspect, alone or in combination with one or more of the first through eighteenth aspects, another TB of the multiple TBs is associated with a single beam.

In a twentieth aspect, alone or in combination with one or more of the first through nineteenth aspects, the multiple TBs include a given TB and another TB associated with a particular link direction, wherein the given TB is associated with a first beam, and the other TB is associated with a second beam different than the first beam.

In a twenty-first aspect, alone or in combination with one or more of the first through twentieth aspects, the scheduling information is received via downlink control information.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
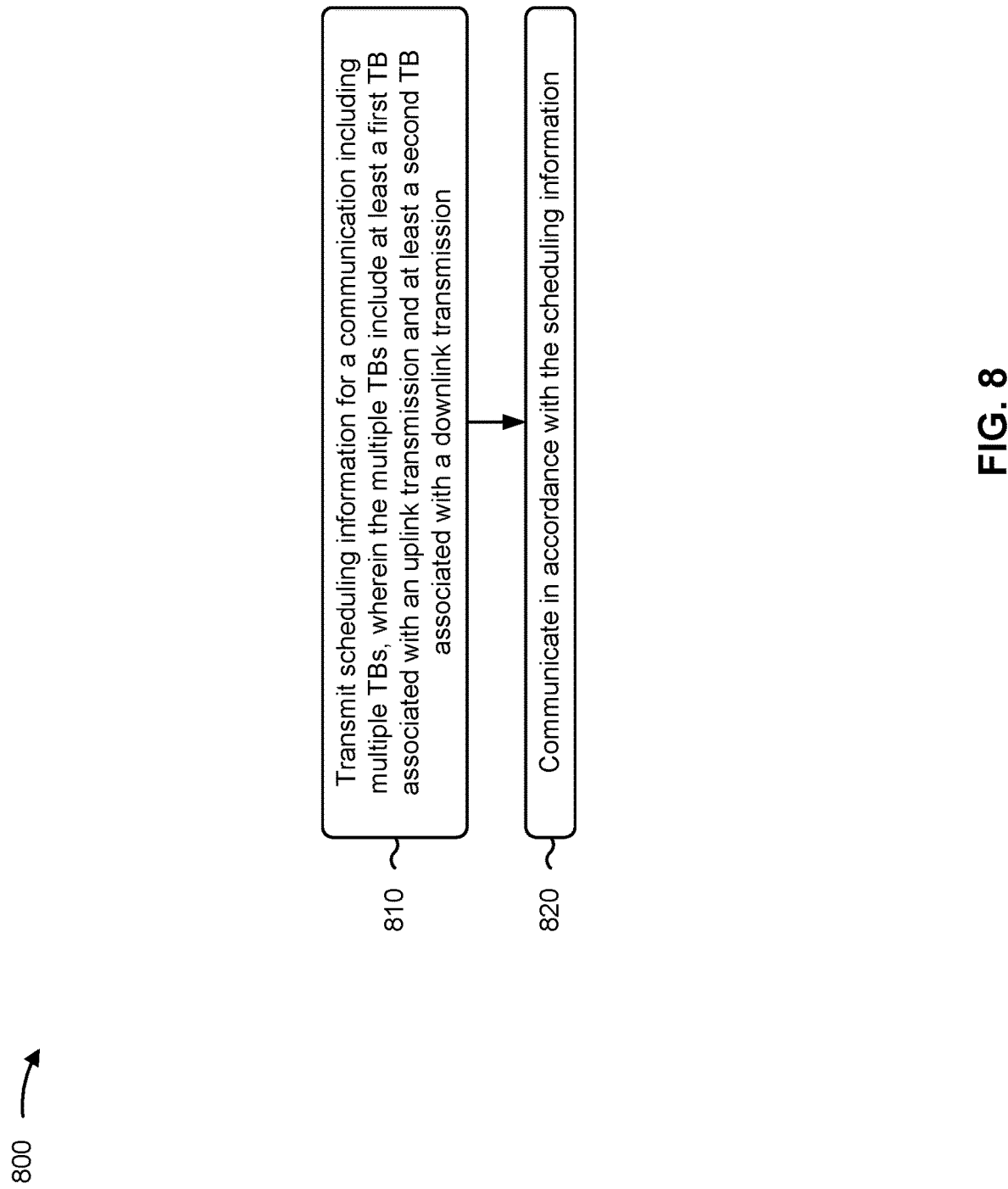

FIG. 8 is a diagram illustrating an example process 800 performed, for example, by a base station, in accordance with the present disclosure. Example process 800 is an example where the base station (e.g., base station 110) performs operations associated with scheduling a transmission with multiple transport blocks.

As shown in FIG. 8, in some aspects, process 800 may include transmitting scheduling information for a communication including multiple TBs, wherein the multiple TBs include at least a first TB associated with an uplink transmission and at least a second TB associated with a downlink transmission (block 810). For example, the base station (e.g., using transmission component 1004, depicted in FIG. 10) may transmit scheduling information for a communication including multiple TBs, wherein the multiple TBs include at least a first TB associated with an uplink transmission and at least a second TB associated with a downlink transmission, as described above.

As further shown in FIG. 8, in some aspects, process 800 may include communicating in accordance with the scheduling information (block 820). For example, the base station (e.g., using reception component 1002 and transmission component 1004, depicted in FIG. 10) may communicate in accordance with the scheduling information, as described above.

Process 800 may include additional aspects, such as any single aspect or any combination of aspects described below and/or in connection with one or more other processes described elsewhere herein.

In a first aspect, the communication includes multiple TBs associated with the uplink transmission or multiple TBs associated with the downlink transmission, and each TB, of the multiple TBs associated with the uplink transmission or the multiple TBs associated with the downlink transmission, carries different data.

In a second aspect, alone or in combination with the first aspect, the communication includes multiple TBs associated with the uplink transmission or multiple TBs associated with the downlink transmission, and each TB, of the multiple TBs associated with the uplink transmission or the multiple TBs associated with the downlink transmission, uses a different beam.

In a third aspect, alone or in combination with one or more of the first and second aspects, a TB, of the multiple TBs, crosses a slot boundary of a first slot and a second slot, and communicating in accordance with the scheduling information further comprises communicating a first part of the TB in the first slot, and a remainder of the TB in the second slot.

In a fourth aspect, alone or in combination with one or more of the first through third aspects, the first part of the TB and the remainder of the TB are separated from each other by a gap.

In a fifth aspect, alone or in combination with one or more of the first through fourth aspects, the first part of the TB and the remainder of the TB are contiguous to each other.

In a sixth aspect, alone or in combination with one or more of the first through fifth aspects, a TB, of the multiple TBs, crosses a slot boundary of a first slot and a second slot, and communicating in accordance with the scheduling information further comprises communicating the TB in the first slot, and another TB of the multiple TBs in the second slot, wherein the TB is associated with a higher data rate and a smaller number of symbols than the other TB.

In a seventh aspect, alone or in combination with one or more of the first through sixth aspects, the scheduling information is based at least in part on a rule that disallows scheduling a TB that crosses a slot boundary of a first slot and a second slot.

In an eighth aspect, alone or in combination with one or more of the first through seventh aspects, the first TB and the second TB are time division multiplexed.

In a ninth aspect, alone or in combination with one or more of the first through eighth aspects, the first TB and the second TB overlap in a time dimension.

In a tenth aspect, alone or in combination with one or more of the first through ninth aspects, the scheduling information indicates a first beam for the first TB and a second beam for the second TB, and, if the first TB and the second TB overlap in time, the first beam and the second beam are paired beams associated with a self-interference metric that satisfies a threshold.

In an eleventh aspect, alone or in combination with one or more of the first through tenth aspects, if the first TB and the second TB cross a slot boundary and overlap with each other in time, a first part of the first TB and the second TB uses a first set of paired beams and a second part of the first TB and the second TB use a second set of paired beams.

In a twelfth aspect, alone or in combination with one or more of the first through eleventh aspects, the second set of paired beams are the same as the first set of paired beams.

In a thirteenth aspect, alone or in combination with one or more of the first through twelfth aspects, the second set of paired beams are different than the first set of paired beams.

In a fourteenth aspect, alone or in combination with one or more of the first through thirteenth aspects, the first TB and the second TB are configured with repetitions, and each repetition uses a respective set of paired downlink and uplink beams.

In a fifteenth aspect, alone or in combination with one or more of the first through fourteenth aspects, each repetition of a TB, of the first TB or the second TB, that is associated with a given link direction, uses a same beam.

In a sixteenth aspect, alone or in combination with one or more of the first through fifteenth aspects, the repetitions of a TB, of the first TB or the second TB, associated with a given link direction, use a given beamsweeping configuration.

In a seventeenth aspect, alone or in combination with one or more of the first through sixteenth aspects, the repetitions of a TB, of the first TB or the second TB, associated with a downlink and an uplink, use a given beamsweeping configuration.

In an eighteenth aspect, alone or in combination with one or more of the first through seventeenth aspects, the scheduling information indicates that a TB of the multiple TBs is associated with multiple beams.

In a nineteenth aspect, alone or in combination with one or more of the first through eighteenth aspects, another TB of the multiple TBs is associated with a single beam.

In a twentieth aspect, alone or in combination with one or more of the first through nineteenth aspects, the multiple TBs include a given TB and another TB associated with a particular link direction, wherein the given TB is associated with a first beam, and the other TB is associated with a second beam different than the first beam.

In a twenty-first aspect, alone or in combination with one or more of the first through twentieth aspects, the scheduling information is transmitted via downlink control information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
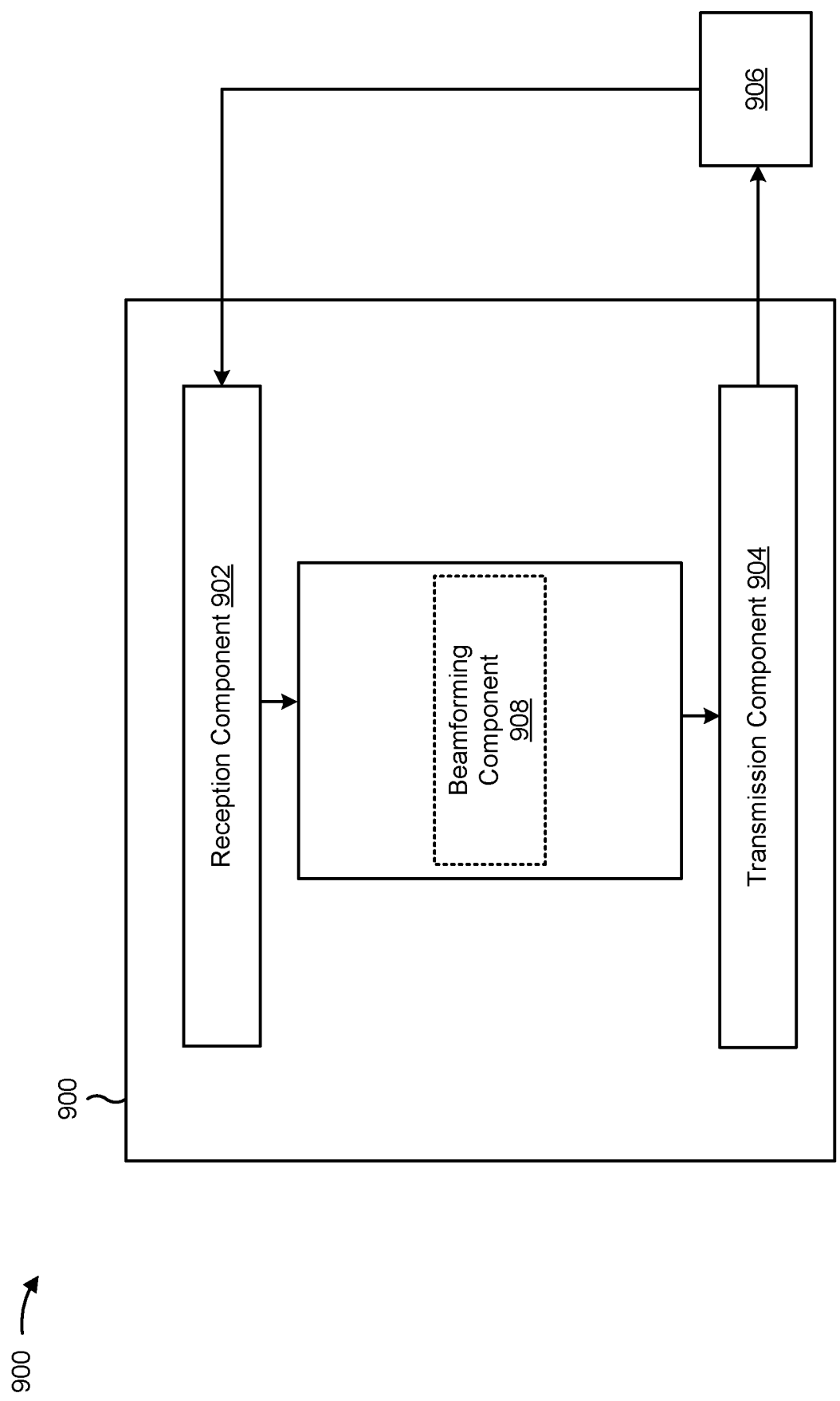
FIGS. 9-10 are block diagrams of example apparatuses for wireless communication, in accordance with the present disclosure.

FIG. 9 is a block diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a beamforming component 908, among other examples.

In some aspects, the apparatus 900 may be configured to perform one or more operations described herein in connection with FIGS. 3-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive scheduling information for a communication including multiple TBs, wherein the multiple TBs include at least a first TB associated with an uplink transmission and at least a second TB associated with a downlink transmission. The reception component 902 and the transmission component 904 may communicate in accordance with the scheduling information. The beamforming component 908 may generate beams based at least in part on the scheduling information, such as based at least in part on TCI state(s) indicated by the scheduling information.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
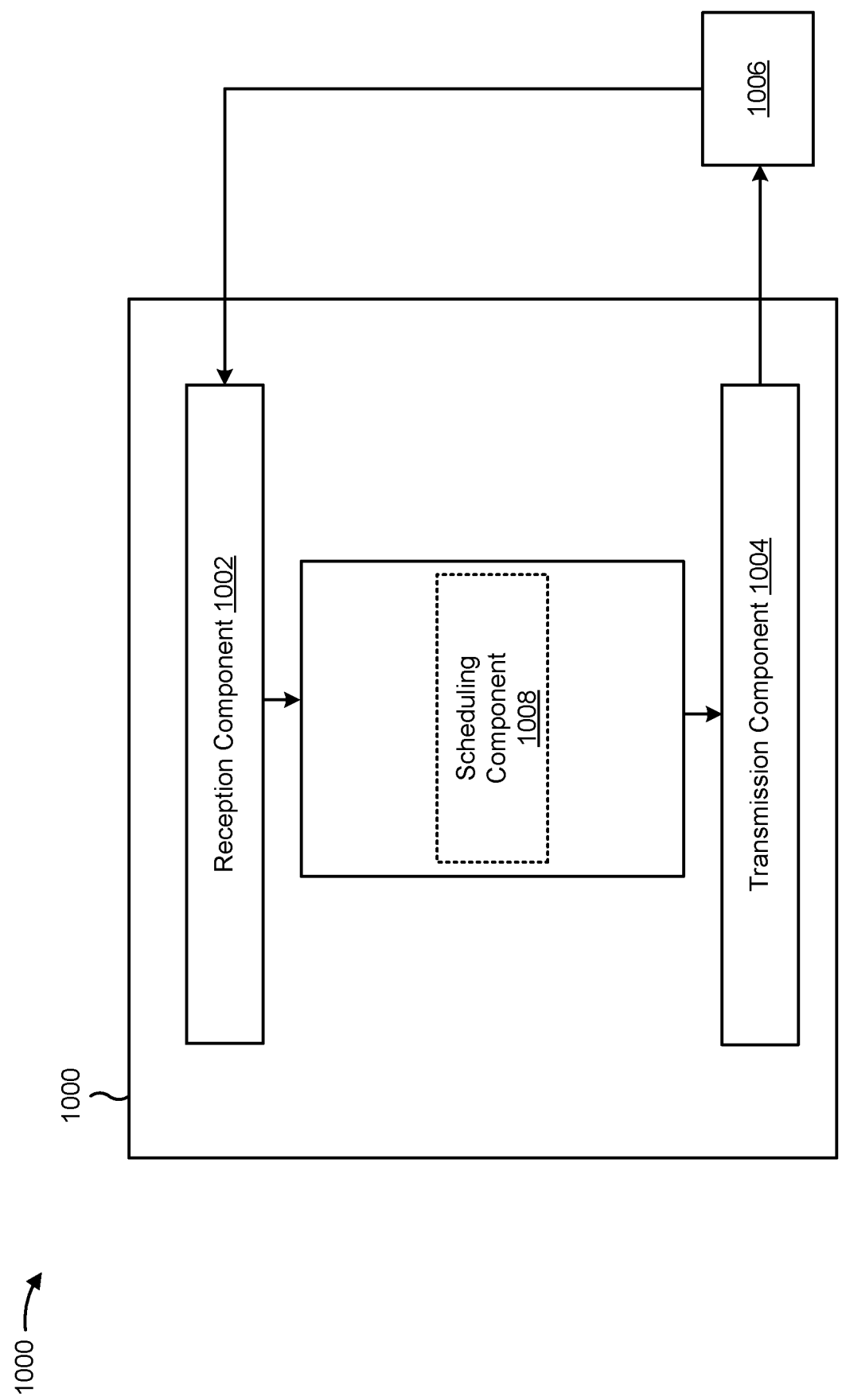

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a scheduling component 1008, among other examples.

In some aspects, the apparatus 1000 may be configured to perform one or more operations described herein in connection with FIGS. 3-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit scheduling information for a communication including multiple TBs, wherein the multiple TBs include at least a first TB associated with an uplink transmission and at least a second TB associated with a downlink transmission. The transmission component 1004 and the reception component 1002 may communicate in accordance with the scheduling information. The scheduling component 1008 may generate the scheduling information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving scheduling information for a communication including multiple transport blocks (TBs), wherein the multiple TBs include at least a first TB associated with an uplink transmission and at least a second TB associated with a downlink transmission; and communicating in accordance with the scheduling information.

Aspect 2: The method of Aspect 1, wherein the communication includes multiple TBs associated with the uplink transmission or multiple TBs associated with the downlink transmission, and wherein each TB, of the multiple TBs associated with the uplink transmission or the multiple TBs associated with the downlink transmission, carries different data.

Aspect 3: The method of any of Aspects 1-2, wherein the communication includes multiple TBs associated with the uplink transmission or multiple TBs associated with the downlink transmission, and wherein each TB, of the multiple TBs associated with the uplink transmission or the multiple TBs associated with the downlink transmission, uses a different beam.

Aspect 4: The method of any of Aspects 1-3, wherein a TB, of the multiple TBs, crosses a slot boundary of a first slot and a second slot, and wherein communicating in accordance with the scheduling information further comprises: communicating a first part of the TB in the first slot, and a remainder of the TB in the second slot.

Aspect 5: The method of Aspect 4, wherein the first part of the TB and the remainder of the TB are separated from each other by a gap.

Aspect 6: The method of Aspect 4, wherein the first part of the TB and the remainder of the TB are contiguous to each other.

Aspect 7: The method of any of Aspects 1-6, wherein a TB, of the multiple TBs, crosses a slot boundary of a first slot and a second slot, and wherein communicating in accordance with the scheduling information further comprises: communicating the TB in the first slot, and another TB of the multiple TBs in the second slot, wherein the TB is associated with a higher data rate and a smaller number of symbols than the other TB.

Aspect 8: The method of any of Aspects 1-7, wherein the scheduling information is based at least in part on a rule that disallows scheduling a TB that crosses a slot boundary of a first slot and a second slot.

Aspect 9: The method of any of Aspects 1-8, wherein the first TB and the second TB are time division multiplexed.

Aspect 10: The method of any of Aspects 1-8, wherein the first TB and the second TB overlap in a time dimension.

Aspect 11: The method of any of Aspects 1-10, wherein the scheduling information indicates a first beam for the first TB and a second beam for the second TB, and wherein, if the first TB and the second TB overlap in time, the first beam and the second beam are paired beams associated with a self-interference measurement that satisfies a threshold.

Aspect 12: The method of Aspect 10, wherein, if the first TB and the second TB cross a slot boundary and overlap with each other in time, a first part of the first TB and the second TB uses a first set of paired beams, and a second part of the first TB and the second TB use a second set of paired beams.

Aspect 13: The method of Aspect 12, wherein the second set of paired beams are the same as the first set of paired beams.

Aspect 14: The method of Aspect 12, wherein the second set of paired beams are different than the first set of paired beams.

Aspect 15: The method of Aspect 10, wherein the first TB and the second TB are configured with repetitions, and wherein each repetition uses a respective set of paired downlink and uplink beams.

Aspect 16: The method of Aspect 15, wherein each repetition of a TB, of the first TB or the second TB, that is associated with a given link direction, uses a same beam.

Aspect 17: The method of Aspect 15, wherein the repetitions of a TB, of the first TB or the second TB, associated with a given link direction use a given beamsweeping configuration.

Aspect 18: The method of Aspect 15, wherein the repetitions of a TB, of the first TB or the second TB, associated with a downlink and an uplink use a given beamsweeping configuration.

Aspect 19: The method of any of Aspects 1-18, wherein the scheduling information indicates that a TB of the multiple TBs is associated with multiple beams.

Aspect 20: The method of Aspect 19, wherein another TB of the multiple TBs is associated with a single beam.

Aspect 21: The method of any of Aspects 1-20, wherein the multiple TBs include a given TB and another TB associated with a particular link direction, wherein the given TB is associated with a first beam, and wherein the other TB is associated with a second beam different than the first beam.

Aspect 22: The method of any of Aspects 1-21, wherein the scheduling information is received via downlink control information.

Aspect 23: A method of wireless communication performed by a base station, comprising: transmitting scheduling information for a communication including multiple transport blocks (TBs), wherein the multiple TBs include at least a first TB associated with an uplink transmission and at least a second TB associated with a downlink transmission; and communicating in accordance with the scheduling information.

Aspect 24: The method of Aspect 23, wherein communication includes multiple TBs associated with the uplink transmission or multiple TBs associated with the downlink transmission, and wherein each TB, of the multiple TBs associated with the uplink transmission or the multiple TBs associated with the downlink transmission, carries different data.

Aspect 25: The method of any of Aspects 23-24, wherein the communication includes multiple TBs associated with the uplink transmission or multiple TBs associated with the downlink transmission, and wherein each TB, of the multiple TBs associated with the uplink transmission or the multiple TBs associated with the downlink transmission, uses a different beam.

Aspect 26: The method of any of Aspects 23-25, wherein a TB, of the multiple TBs, crosses a slot boundary of a first slot and a second slot, and wherein communicating in accordance with the scheduling information further comprises: communicating a first part of the TB in the first slot, and a remainder of the TB in the second slot.

Aspect 27: The method of Aspect 26, wherein the first part of the TB and the remainder of the TB are separated from each other by a gap.

Aspect 28: The method of Aspect 26, wherein the first part of the TB and the remainder of the TB are contiguous to each other.

Aspect 29: The method of any of Aspects 23-28, wherein a TB, of the multiple TBs, crosses a slot boundary of a first slot and a second slot, and wherein communicating in accordance with the scheduling information further comprises: communicating the TB in the first slot, and another TB of the multiple TBs in the second slot, wherein the TB is associated with a higher data rate and a smaller number of symbols than the other TB.

Aspect 30: The method of any of Aspects 23-29, wherein the scheduling information is based at least in part on a rule that disallows scheduling a TB that crosses a slot boundary of a first slot and a second slot.

Aspect 31: The method of any of Aspects 23-30, wherein the first TB and the second TB are time division multiplexed.

Aspect 32: The method of any of Aspects 23-30, wherein the first TB and the second TB overlap in a time dimension.

Aspect 33: The method of any of Aspects 23-32, wherein the scheduling information indicates a first beam for the first TB and a second beam for the second TB, and wherein, if the first TB and the second TB overlap in time, the first beam and the second beam are paired beams associated with a self-interference metric that satisfies a threshold.

Aspect 34: The method of Aspect 33, wherein, if the first TB and the second TB cross a slot boundary and overlap with each other in time, a first part of the first TB and the second TB uses a first set of paired beams and a second part of the first TB and the second TB use a second set of paired beams.

Aspect 35: The method of Aspect 34, wherein the second set of paired beams are the same as the first set of paired beams.

Aspect 36: The method of Aspect 34, wherein the second set of paired beams are different than the first set of paired beams.

Aspect 37: The method of Aspect 33, wherein the first TB and the second TB are configured with repetitions, and wherein each repetition uses a respective set of paired downlink and uplink beams.

Aspect 38: The method of Aspect 37, wherein each repetition of a TB, of the first TB or the second TB, that is associated with a given link direction, uses a same beam.

Aspect 39: The method of Aspect 37, wherein the repetitions of a TB, of the first TB or the second TB, associated with a given link direction use a given beamsweeping configuration.

Aspect 40: The method of Aspect 37, wherein the repetitions of a TB, of the first TB or the second TB, associated with a downlink and an uplink use a given beamsweeping configuration.

Aspect 41: The method of any of Aspects 23-40, wherein the scheduling information indicates that a TB of the multiple TBs is associated with multiple beams.

Aspect 42: The method of Aspect 41, wherein another TB of the multiple TBs is associated with a single beam.

Aspect 43: The method of any of Aspects 23-42, wherein the multiple TBs include a given TB and another TB associated with a particular link direction, wherein the given TB is associated with a first beam, and wherein the other TB is associated with a second beam different than the first beam.

Aspect 44: The method of any of Aspects 23-43, wherein the scheduling information is transmitted via downlink control information.

Aspect 45: An apparatus for wireless communication at a device, comprising a processor; memory coupled with the processor; and instructions stored in the memory and executable by the processor to cause the apparatus to perform the method of one or more Aspects of Aspects 1-44.

Aspect 46: A device for wireless communication, comprising a memory and one or more processors coupled to the memory, the memory and the one or more processors configured to perform the method of one or more Aspects of Aspects 1-44.

Aspect 47: An apparatus for wireless communication, comprising at least one means for performing the method of one or more Aspects of Aspects 1-44.

Aspect 48: A non-transitory computer-readable medium storing code for wireless communication, the code comprising instructions executable by a processor to perform the method of one or more Aspects of Aspects 1-44.

Aspect 49: A non-transitory computer-readable medium storing a set of instructions for wireless communication, the set of instructions comprising one or more instructions that, when executed by one or more processors of a device, cause the device to perform the method of one or more Aspects of Aspects 1-44.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a single downlink control information (DCI) providing scheduling information for a communication including multiple transport blocks (TBs) that comprise at least a first TB associated with an uplink transmission and at least a second TB associated with a downlink transmission; and
   communicating in accordance with the scheduling information.

2. The method of claim 1, wherein the communication includes multiple TBs associated with the uplink transmission or multiple TBs associated with the downlink transmission, and wherein each TB, of the multiple TBs associated with the uplink transmission or the multiple TBs associated with the downlink transmission, carries different data.

3. The method of claim 1, wherein the communication includes multiple TBs associated with the uplink transmission or multiple TBs associated with the downlink transmission, and wherein each TB, of the multiple TBs associated with the uplink transmission or the multiple TBs associated with the downlink transmission, uses a different beam.

4. The method of claim 1, wherein a TB, of the multiple TBs, crosses a slot boundary of a first slot and a second slot, and wherein communicating in accordance with the scheduling information further comprises:
   communicating a first part of the TB in the first slot, and a remainder of the TB in the second slot.

5. The method of claim 1, wherein a TB, of the multiple TBs, crosses a slot boundary of a first slot and a second slot, and wherein communicating in accordance with the scheduling information further comprises:
   communicating the TB in the first slot, and another TB of the multiple TBs in the second slot, wherein the TB is associated with a higher data rate and a smaller number of symbols than the other TB.

6. The method of claim 1, wherein the scheduling information is based at least in part on a rule that disallows scheduling a TB that crosses a slot boundary of a first slot and a second slot.

7. The method of claim 1, wherein the first TB and the second TB are time division multiplexed.

8. The method of claim 1, wherein the first TB and the second TB overlap in a time dimension.

9. The method of claim 1, wherein the scheduling information indicates a first beam for the first TB and a second beam for the second TB, and wherein, if the first TB and the second TB overlap in time, the first beam and the second beam are paired beams associated with a self-interference measurement that satisfies a threshold.

10. The method of claim 9, wherein, if the first TB and the second TB cross a slot boundary and overlap with each other in time, a first part of the first TB and the second TB uses a first set of paired beams, and a second part of the first TB and the second TB use a second set of paired beams.

11. The method of claim 9, wherein the first TB and the second TB are configured with repetitions, and wherein each repetition uses a respective set of paired downlink and uplink beams.

12. The method of claim 1, wherein the scheduling information indicates that a TB of the multiple TBs is associated with multiple beams.

13. The method of claim 1, wherein the multiple TBs include a given TB and another TB associated with a particular link direction, wherein the given TB is associated with a first beam, and wherein the other TB is associated with a second beam different than the first beam.

14. A method of wireless communication performed by a network entity, comprising:
transmitting a single downlink control information (DCI) providing scheduling information for a communication including multiple transport blocks (TBs) that comprise at least a first TB associated with an uplink transmission and at least a second TB associated with a downlink transmission; and
communicating in accordance with the scheduling information.

15. The method of claim 14, wherein communication includes multiple TBs associated with the uplink transmission or multiple TBs associated with the downlink transmission, and wherein each TB, of the multiple TBs associated with the uplink transmission or the multiple TBs associated with the downlink transmission, carries different data.

16. The method of claim 14, wherein the communication includes multiple TBs associated with the uplink transmission or multiple TBs associated with the downlink transmission, and wherein each TB, of the multiple TBs associated with the uplink transmission or the multiple TBs associated with the downlink transmission, uses a different beam.

17. The method of claim 14, wherein a TB, of the multiple TBs, crosses a slot boundary of a first slot and a second slot, and wherein communicating in accordance with the scheduling information further comprises:
communicating a first part of the TB in the first slot, and a remainder of the TB in the second slot.

18. The method of claim 14, wherein a TB, of the multiple TBs, crosses a slot boundary of a first slot and a second slot, and wherein communicating in accordance with the scheduling information further comprises:
communicating the TB in the first slot, and another TB of the multiple TBs in the second slot, wherein the TB is associated with a higher data rate and a smaller number of symbols than the other TB.

19. The method of claim 14, wherein the scheduling information is based at least in part on a rule that disallows scheduling a TB that crosses a slot boundary of a first slot and a second slot.

20. The method of claim 14, wherein the first TB and the second TB are time division multiplexed.

21. The method of claim 14, wherein the first TB and the second TB overlap in a time dimension.

22. The method of claim 14, wherein the scheduling information indicates a first beam for the first TB and a second beam for the second TB, and wherein, if the first TB and the second TB overlap in time, the first beam and the second beam are paired beams associated with a self-interference metric that satisfies a threshold.

23. The method of claim 22, wherein, if the first TB and the second TB cross a slot boundary and overlap with each other in time, a first part of the first TB and the second TB uses a first set of paired beams and a second part of the first TB and the second TB use a second set of paired beams.

24. The method of claim 22, wherein the first TB and the second TB are configured with repetitions, and wherein each repetition uses a respective set of paired downlink and uplink beams.

25. The method of claim 14, wherein the scheduling information indicates that a TB of the multiple TBs is associated with multiple beams.

26. A user equipment (UE) for wireless communication, comprising:
a memory; and
one or more processors, coupled to the memory, configured to:
receive a single downlink control information (DCI) providing scheduling information for a communication including multiple transport blocks (TBs) that comprise at least a first TB associated with an uplink transmission and at least a second TB associated with a downlink transmission; and
communicate in accordance with the scheduling information.

27. The UE of claim 26, wherein a TB, of the multiple TBs, crosses a slot boundary of a first slot and a second slot, and wherein, when communicating in accordance with the scheduling information, the one or more processors are configured to:
communicate a first part of the TB in the first slot, and a remainder of the TB in the second slot.

28. A network entity for wireless communication, comprising:
a memory; and
one or more processors, coupled to the memory, configured to:
transmit a single downlink control information (DCI) providing scheduling information for a communication including multiple transport blocks (TBs) that comprise at least a first TB associated with an uplink transmission and at least a second TB associated with a downlink transmission; and
communicate in accordance with the scheduling information.

29. The network entity of claim 28, wherein a TB, of the multiple TBs, crosses a slot boundary of a first slot and a second slot, and wherein, when communicating in accordance with the scheduling information, the one or more processors are configured to:
communicate a first part of the TB in the first slot, and a remainder of the TB in the second slot.

30. The method of claim 14, wherein the multiple TBs include a given TB and another TB associated with a particular link direction, wherein the given TB is associated with a first beam, and wherein the other TB is associated with a second beam different than the first beam.

* * * * *